US012801426B2

(12) United States Patent
Tang et al.

(10) Patent No.: US 12,801,426 B2
(45) Date of Patent: Nov. 17, 2026

(54) TRANSACTION MERGING METHOD AND TRANSACTION MERGING SYSTEM

(71) Applicant: MEDIATEK INC., Hsin-Chu (TW)

(72) Inventors: En-Shou Tang, Hsinchu City (TW); Yuan-Chun Lin, Hsinchu City (TW); Ming-Lun Hsieh, Hsinchu City (TW); Chia-Yuan Chang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 475 days.

(21) Appl. No.: 18/231,797

(22) Filed: Aug. 9, 2023

(65) Prior Publication Data

US 2024/0061703 A1 Feb. 22, 2024

Related U.S. Application Data

(60) Provisional application No. 63/398,845, filed on Aug. 17, 2022.

(51) Int. Cl.
*G06F 9/44* (2018.01)
*G06F 9/46* (2006.01)

(52) U.S. Cl.
CPC .................................... *G06F 9/466* (2013.01)

(58) Field of Classification Search
CPC ....................................................... G06F 9/466
USPC .......................................................... 718/101
See application file for complete search history.

(56) References Cited

U.S. PATENT DOCUMENTS

2009/0049256 A1* 2/2009 Hughes ............... G06F 13/1626 711/158
2009/0240895 A1* 9/2009 Nyland ................. G06F 9/3888 711/149
2016/0077751 A1* 3/2016 Benedict .............. G06F 3/0673 711/105
2019/0182123 A1 6/2019 Gupta
2021/0203615 A1 7/2021 Roy

FOREIGN PATENT DOCUMENTS

CN 1303050 A 7/2001
CN 103685060 A 3/2014
CN 109905327 A 6/2019
TW 200710671 3/2007
TW 200928732 7/2009
TW 201218799 A1 5/2012

* cited by examiner

*Primary Examiner* — Timothy A Mudrick
(74) *Attorney, Agent, or Firm* — Winston Hsu

(57) ABSTRACT

A transaction merging method for a first electronic device and a second electronic device. The transaction merging method comprises: (a) receiving a plurality of input transactions from the first electronic device; (b) setting a merge condition of the input transactions according to a transmission condition between the first electronic device and the second electronic device; (c) merging the input transactions according to the merge condition to generate at least one transaction group; and (d) transmitting the transaction group to the second electronic device.

20 Claims, 7 Drawing Sheets

TRANSACTION MERGING METHOD AND TRANSACTION MERGING SYSTEM

CROSS REFERENCE TO RELATED APPLICATIONS

This application claims the benefit of U.S. Provisional Application No. 63/398,845, filed on Aug. 17, 2022. The content of the application is incorporated herein by reference.

BACKGROUND

For a conventional transaction process, a merge device is applied for merging transactions to increase the accessing efficiency or the transmission efficiency. A conventional merge device uses a fixed merging window to perform merging, thus causes fixed transaction latency. However, the electronic device which receives the merged transactions may have different bandwidth conditions. Also, different circuits or components may have different latency tolerances. Besides, different transactions may also have different latency tolerances. Accordingly, it is not suitable to use a fixed merging window while merging the transactions.

SUMMARY

One objective of the present application is to provide a transaction merging method which can dynamically change a size of the merge window.

Another objective of the present application is to provide a transaction merging system which can dynamically change a size of the merge window.

One embodiment of the present application discloses a transaction merging method for a first electronic device and a second electronic device. The transaction merging method comprises: (a) receiving a plurality of input transactions from the first electronic device; (b) setting a merge condition of the input transactions according to a transmission condition between the first electronic device and the second electronic device; (c) merging the input transactions according to the merge condition to generate at least one transaction group; and (d) transmitting the transaction group to the second electronic device.

Another embodiment of the present application discloses a transaction merging system, comprising: a first communication interface, configured to receive a plurality of input transactions from the first electronic device; a merge device, configured to set a merge condition of the input transactions according to a transmission condition between the first electronic device and the second electronic device, and configured to merge the input transactions according to the merge condition to generate at least one transaction group; a second communication interface, configured to transmit the transaction group to a second electronic device.

In one embodiment, the input transactions respectively comprise at least one command, such as a write command or a read command. The first electronic device may be a master device and the second electronic device may be a slave device. In another embodiment, the first electronic device is a GPU and the second electronic device is a DRAM controller.

In view of above-mentioned embodiments, the merge condition can be dynamically changed corresponding to different transmission conditions, thus the issue caused by the fixed merge window of a conventional merge device can be improved.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. The term "first", "second", "third" in following descriptions are only for the purpose of distinguishing different one elements, and do not mean the sequence of the elements. For example, a first device and a second device only mean these devices can have the same structure but are different devices.

Figure 1:
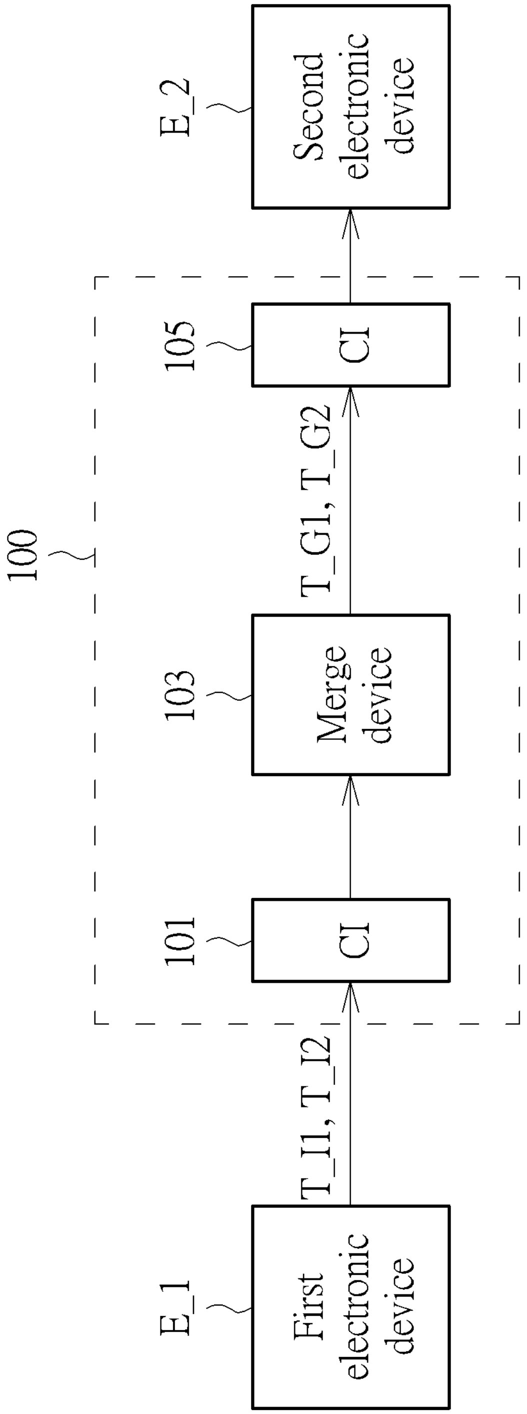
FIG. 1 is a block diagram illustrating a transaction merging system according to one embodiment of the present application.

FIG. 1 is a block diagram illustrating a transaction merging system 100 according to one embodiment of the present application. As shown in FIG. 1, the transaction merging system 100 comprises a first communication interface 101, a merge device 103 and a second communication interface 105. The first communication interface 101 is configured to receive a plurality of input transactions (input transactions T_I1, T_I2 are used as examples for explaining) from the first electronic device E_1. The first communication interface 101 can also receive data or response from the second electronic device E_2.

The merge device 103 is configured to set a merge condition of the input transactions T_I1, T_I2 according to a transmission condition between the first electronic device E_1 and the second electronic device E_2, and configured to merge the input transactions T_I1, T_I2 according to the merge condition to generate at least one transaction group (transaction groups T_G1, T_G2 are used as an example for explaining). The second communication interface 105 is configured to transmit the transaction groups T_G1, T_G2 to a second electronic device E_2. The second communication interface 105 can also receive data or response from the second electronic device E_2.

In one embodiment, the input transactions T_I1, T_I2 respectively comprises at least one command, such as a write command or a read command. In one embodiment, the first electronic device E_1 is a master device and the second electronic device E_2 is a slave device. In another embodiment, the first electronic device E_1 is a GPU (Graphic Processing Unit) and the second electronic device E_2 is a DRAM controller.

As above-mentioned, the merge device 103 is configured to set a merge condition of the input transactions T_I1, T_I2 according to a transmission condition between the first electronic device E_1 and the second electronic device E_2. In one embodiment, the merge condition is a size of a merge window of the input transactions T T_I2, and the transmission condition is a bandwidth condition of a target device which is controlled by the second electronic device E_2. For example, if the second electronic device E_2 is a controller (e.g., a DRAM controller) the transmission condition is a bandwidth condition of the target device (e.g., a DRAM) which is controlled by the controller.

Figure 2:
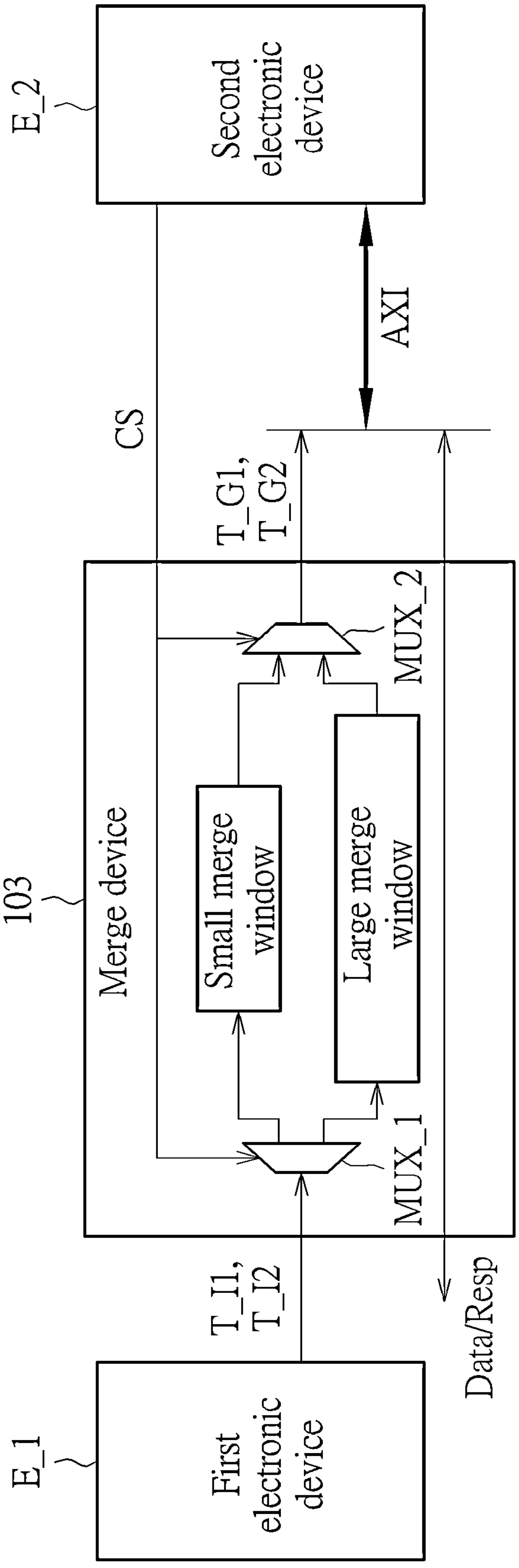
FIG. 2 is a schematic diagram illustrating a merge device of the transaction merging system in FIG. 1, according to one embodiment of the present application.

In following embodiments, merge devices with different structures are provided as examples for explaining the concepts of the present application. For the convenience of illustration, the first communication interface 101 and the second communication interface 103 are not illustrated in following embodiments. FIG. 2 is a schematic diagram illustrating a merge device of the transaction merging system in FIG. 1, according to one embodiment of the present application. In the embodiment of FIG. 2, the input transactions T T_I2 are commands and each of the transaction groups T_G1, T_G2 comprises at least two commands, but does not mean to limit the scope of the present application. As shown in FIG. 2, the merge device 103 selectively use a small merge window or a large merge window to process the input transactions T_I1, T_I2 from the first electronic device E_1 to generate the transaction groups T_G1, T_G2 to the second electronic device E_2.

In the embodiment of FIG. 2, the second electronic device E_2 is a DRAM controller. The DRAM controller is configured to control a DRAM and to generate a control signal CS to select a merge window for processing the input transactions T_I1, T_I2 according to the bandwidth condition of the DRAM. For example, if the available bandwidth (i.e., the bandwidth is not occupied) of the DRAM is smaller than a bandwidth threshold, the large merge window is used such that each of the transaction groups T_G1, T_G2 comprises more transactions, thus the merge device 103 needs a smaller bandwidth to transmit the transaction groups T_G1, T_G2 since less transaction groups are generated. On the opposite, the small merge window is used if the available bandwidth of the DRAM is larger than a bandwidth threshold, such that each of the transaction groups T_G1, T_G2 comprises less transactions, thus more transaction groups are generated the merge device 103 can use a larger bandwidth to transmit the transaction groups.

Figure 3:
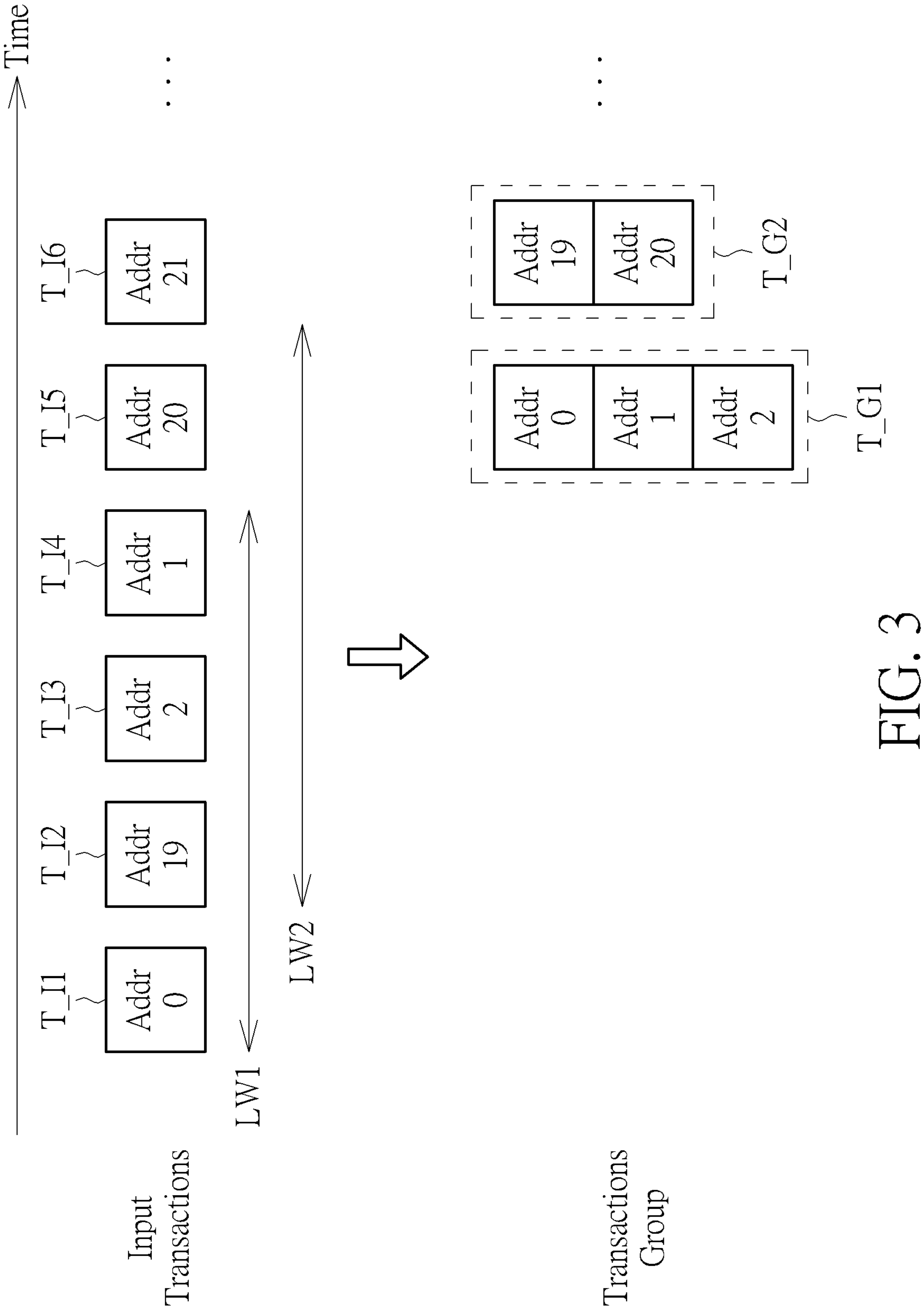
FIG. 3 and FIG. 4 are schematic diagrams illustrating merge windows with different sizes, according to different embodiments of the present application.
Figure 4:
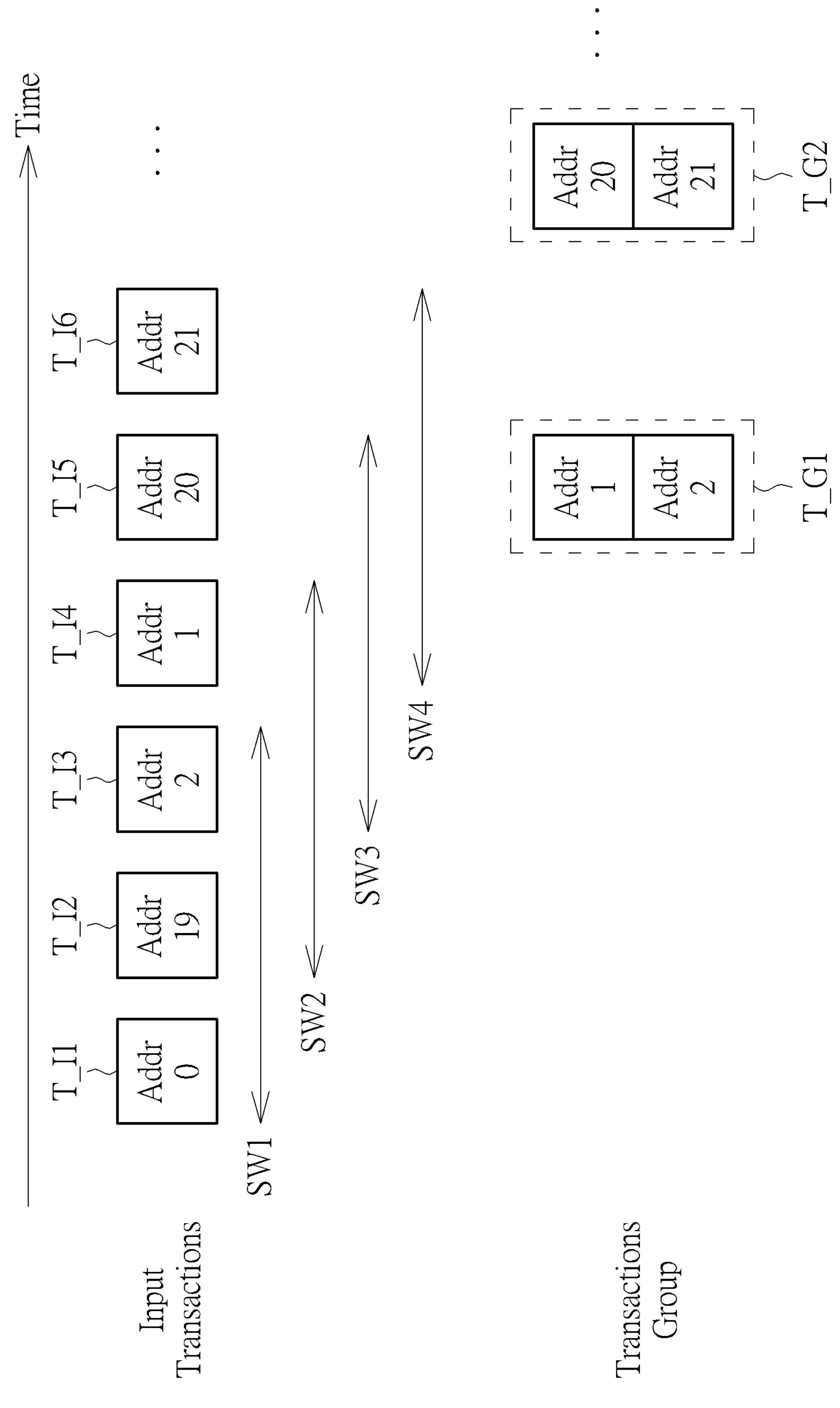

FIG. 3 and FIG. 4 are schematic diagrams illustrating merge windows with different sizes, according to different embodiments of the present application. In the embodiments of FIG. 3 and FIG. 4, the input transactions T_I1, T_I2 are read commands or write commands for a target device which is controlled by the second electronic device E_2. For example, the input transactions T_I1, T_I2 are read commands or write commands for a DRAM which is controlled by a DRAM controller. Also, the merge device 103 merges the input transactions T_I1, T_I2 which correspond to continuous access regions of the target device. In one embodiment, the access regions are addresses. However, the access regions can also be other units, such as a block or page of a DRAM.

Besides, in the embodiment of FIG. 3, the symbols LW1, LW2 mean different times of processes using the large merge window illustrated in FIG. 2. Similarly, in the embodiment of FIG. 4, the symbols SW1, SW2, SW3, SW4 mean different times of processing using the small merge window illustrated in FIG. 2. Additionally, in the embodiments of FIG. 3 and FIG. 4, the input transaction marked by "Addr X" means the input transaction is a command for reading or for writing the address X of the target device. For example, the input transaction marked by "Addr 0" means the input transaction is a command for reading or for writing the address 0 of the target device.

As shown in FIG. 3, during the process LW1, the input transaction T_I1 with the address 0, the input transaction T_I2 with the address 19, the input transaction T_I3 with the address 2, and the input transaction T_I4 with the address 1 are processed. Accordingly, the transaction T_G1 comprising the input transaction T_I1, the input transaction T_I3 and the input transaction T_I4 is generated since the input transaction T_I1, the input transaction T_I3 and the input transaction T_I4 have continuous addresses. Following the same rule, during the process LW2, the input transaction T_I2 with the address 19, and the input transaction T_I5 with the address 20 are processed. Accordingly, the transaction T_G2 comprising the input transaction T_I2 and the input transaction T_I5 is generated since the input transaction T_I2 and the input transaction T_I5 have continuous addresses.

In the embodiment of FIG. 4, during the process SW1, no transaction group is generated since no input transactions have continuous addresses. During a next process SW2, the transaction T_G1 comprising the input transaction T_I3 and the input transaction T_I4 is generated since the input transaction T_I3 and the input transaction T_I4 have continuous addresses. Following the same way, no transaction group is generated during the process SW3 since no input transactions have continuous addresses, and the transaction T_G2 comprising the input transaction T_I5 and the input transaction T_I6 is generated during the process SW4.

Please refer to FIG. 2 again, in the embodiment of FIG. 2, the second electronic device E_2 generates a control signal CS to select the small merge window or the large merge window, according to the available bandwidth. Please note, the multiplexers MUX_1, MUX_2 in FIG. 2 just mean that the small merge window and the large merge window can be selected by the control signal CS, but it does not limit that the merge device 103 must comprise the multiplexers MUX_1, MUX_2. Additionally, in the embodiment of FIG. 2, one of two candidate merge windows (the small merge window and the large merge window) is selected to process the input transactions T_I1, T_I2. However, the number of the candidate merge windows can be more than two. For example, the available bandwidth of the target device can be classified to three levels: high, medium, low, and the candidate merge windows comprise a large merge window, a medium merge window and a small merge window. In such case, one of the three candidate merge windows is selected according whether the available bandwidth is high, medium or low.

After receiving the transaction groups I_G1, I_G2, the second electronic device E_2 acquires the transactions contained in the transaction groups I_G1, I_G2 and correspondingly generates responses corresponding to the transactions. Also, the second electronic device E_2 may read the data from the target electronic device or write data to the target electronic device corresponding to the transactions contained in the transaction groups I_G1, I_G2. In one embodiment, the merge device 103 and the second electronic device E_2 communicate via an AXI (Advanced extensible Interface), but not limited.

The merge device 103 may comprise other components corresponding to types of the first electronic device E_1 or the second electronic device E_2. In one embodiment, the first electronic device E_1 is a GPU and the second electronic device E_2 is a DRAM controller. In such case, the merge device 103 may comprise a FIFO array to collect transactions of an AR channel or an AW channel or collects data of a W channel. The FIFO array is further configured to record time stamps of the transactions or the data. The merge device 103 is configured to merge transactions, as shown in above-mentioned embodiments. The merge device 103 may further comprise a merge ID table for recording which transactions are merged. The data or responses from the second electronic device E_2 can be unpacked based on the merge ID table.

In the above-mentioned embodiments, the transmission condition is a bandwidth condition of the target device controlled by the second electronic device E_2. However, the transmission condition can be other information. In one embodiment, the transmission condition is a type of the input transactions, or a latency sensitivity level of the input transactions. Some types of input transactions may not be suitable for merging or hard to be merged. In such case, a merge window with a small size can be selected thus less input transactions are merged for each merge window. Also, each merge operation may cause latency for transmitting the transactions, thus the size of the merge window can be selected to a latency sensitivity level of the input transactions. For example, a merge window with a small size can be selected thus less input transactions are merged for each merge window, if the input transactions have a high latency sensitivity level. On the opposite, a merge window with a larger size can be selected, if the input transactions have a low latency sensitivity level.

Figure 5:
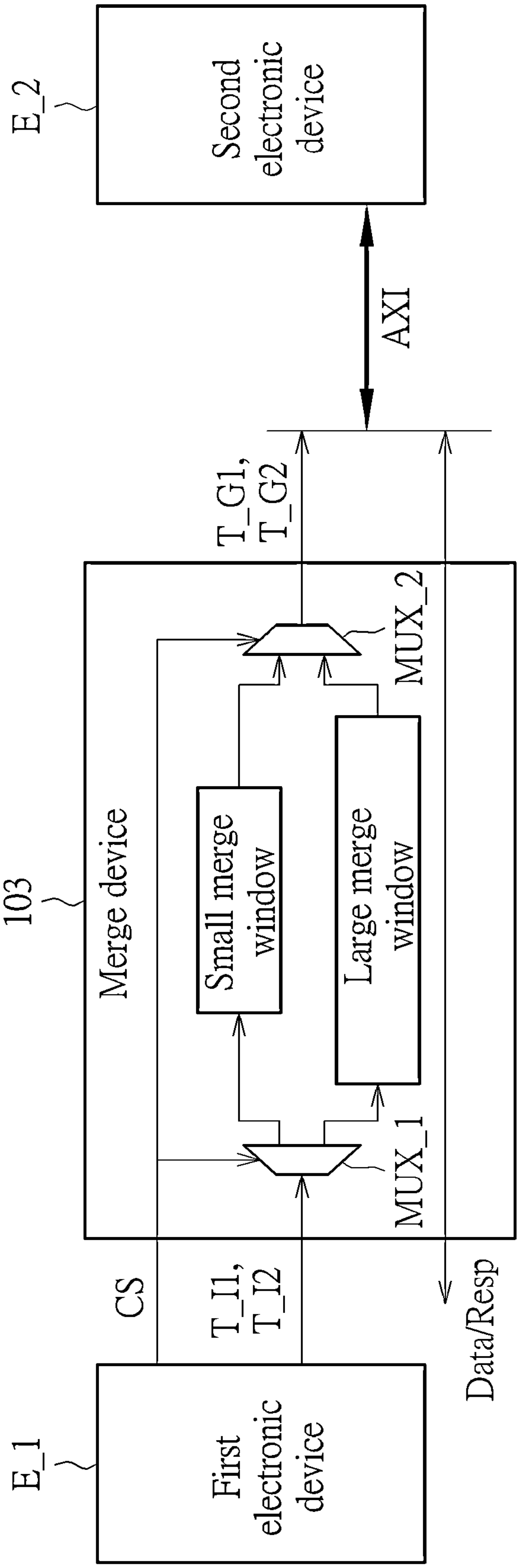
FIG. 5 is a schematic diagram illustrating a merge device of the transaction merging system in FIG. 1, according to another embodiment of the present application.

In such case, the above-mentioned control signal CS is generated by the first electronic device E_1 as shown in FIG. 5 rather than generated by the second electronic device E_2 as shown in FIG. 2. FIG. 5 is a schematic diagram illustrating a merge device of the transaction merging system in FIG. 1, according to another embodiment of the present application. In the embodiment of FIG. 5, the input transactions T_I1, T_I2 are commands and each of the transaction groups T_G1, T_G2 comprises at least two commands. As shown in FIG. 5, the merge device 103 selectively use a small merge window and a large merge window to process the input transactions T_I1, T_I2 from the first electronic device E_1 to generate the transaction groups T_G1, T_G2 to the second electronic device E_2. In the embodiment of FIG. 5, the second electronic device E_2 is a DRAM controller, which is configured to control a DRAM. The first electronic device E_1 generates a control signal CS to select one of the small merge window and the large merge window, according to a latency sensitivity level of the input transactions or the type of the input transactions.

Additionally, in the embodiment of FIG. 5, one of two candidate merge windows (the small merge window and the large merge window) is selected to process the commands. However, the number of the candidate merge windows can be more than two. For example, the latency sensitivity levels of different input transactions can be classified to three levels: high, medium, low, and the candidate merge windows comprise a large merge window, a medium merge window and a small merge window. In such case, one of the three candidate merge windows is selected according whether the latency sensitivity level is high, medium or low. For another example, the types of different input transactions can be classified to three levels: first type, second type, third type, and the candidate merge windows comprise a large merge window, a medium merge window and a small merge window. In such case, one of the three candidate merge windows is selected according whether the type is the first type, the second type, or the third type.

Figure 6:
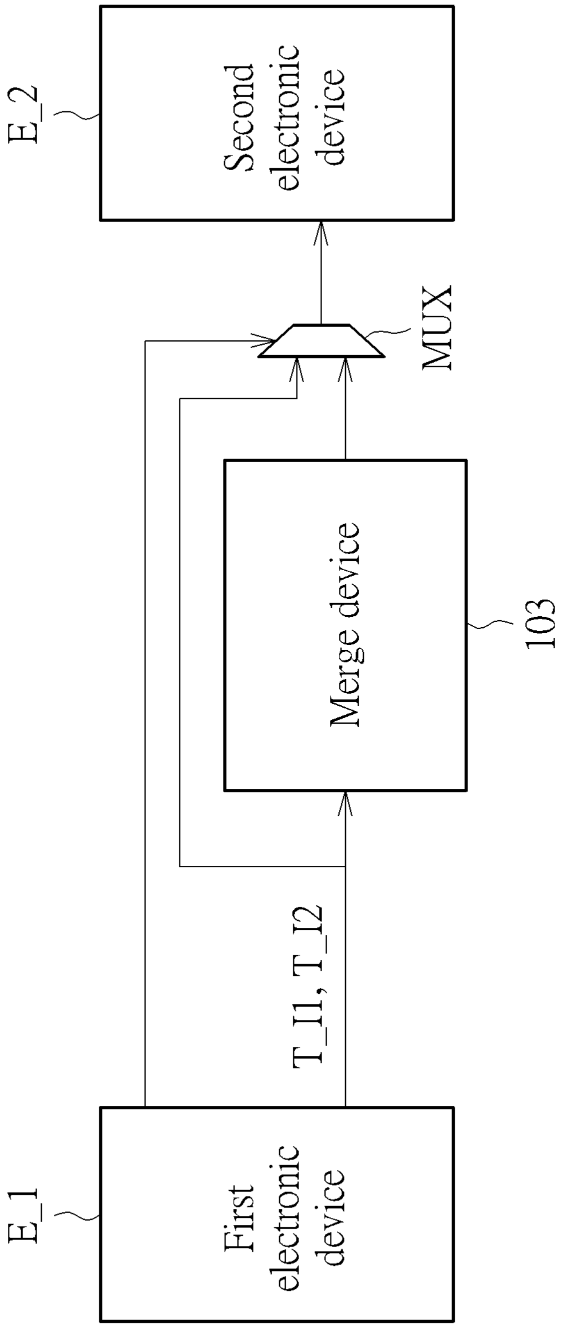
FIG. 6 is a schematic diagram illustrating a merge device of the transaction merging system in FIG. 1, according to still another embodiment of the present application.

In the above-mentioned embodiments, one of the candidate merge windows is selected according to the available bandwidth, the latency sensitivity level of the input transaction or the type of the input transaction. However, in one embodiment, the above-mentioned merge condition is whether the input transactions are merged or not. In other words, the merge device 103 can be selectively bypassed. FIG. 6 is a schematic diagram illustrating a merge device of the transaction merging system in FIG. 1, according to still another embodiment of the present application. As show in FIG. 6, the merge device 103 can be bypassed based on a control signal CS generated by the first electronic device E_1. For example, if the first electronic device E_1 determines that the input transactions T_I1, T_I2 have a high latency sensitivity level or are not suitable for merging, the first electronic device E_1 controls the merge device 103 to be bypassed. If the merge device 103 is bypassed, the input transactions T T_I2 from the first electronic device E_1 are transmitted to the second electronic device E_2 without merging.

The bypass of the merge device 103 is not limited to be controlled by the first electronic device E_1. In another embodiment, the merge device 103 is bypassed according to a control signal generated by the second electronic device E_2 (not illustrated). For example, the merge device 103 is bypassed if the available bandwidth of the target device controlled by the second electronic device E_2 is smaller than a bandwidth threshold. On the contrary, the merge device 103 is used to merge the input transactions T_I1, T_I2 (i.e., not bypassed) if the available bandwidth of the target device is larger than a bandwidth threshold. The embodiment illustrated in FIG. 6 can be combined with the above-mentioned embodiments. For example, the merge device 103 is selectively bypassed according to if the available bandwidth is larger than a first bandwidth threshold, and then the large merge window or small merge window is selected according to if the available bandwidth is larger than a second bandwidth threshold.

Figure 7:
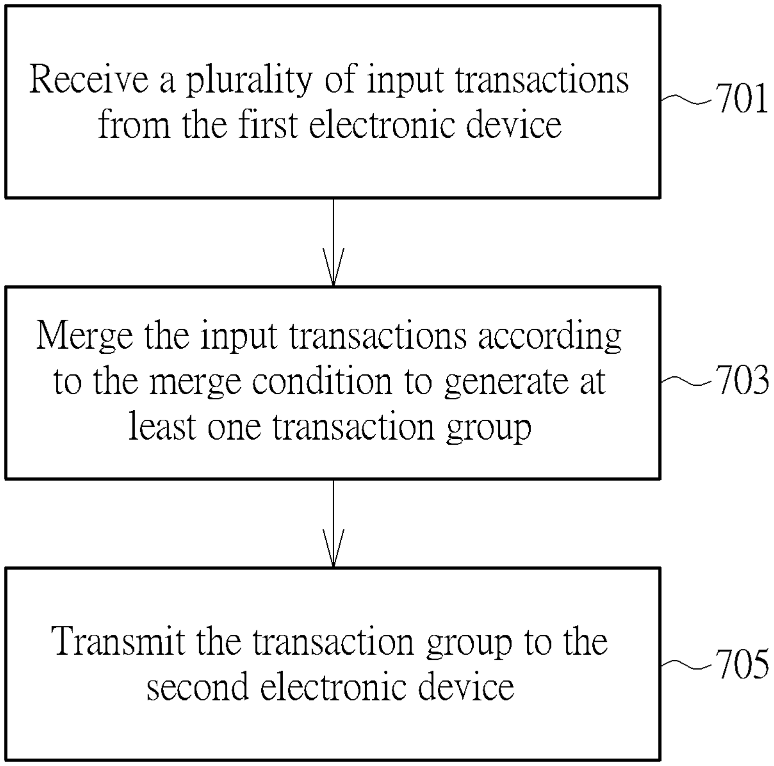
FIG. 7 is a flow chart illustrating a transaction merging method according to one embodiment of the present application.

In view of above-mentioned embodiments, a transaction merging method is acquired. FIG. 7 is a flow chart illustrating a transaction merging method according to one embodiment of the present application, which comprises following steps:

Step 701

Receive a plurality of input transactions (e.g., the input transactions T_I1, T_I2 in FIG. 1) from the first electronic device (e.g., the first electronic device E_1 in FIG. 1).

Step 703

Merge the input transactions according to the merge condition to generate at least one transaction group (e.g., the transaction groups T_G1, T_G2 in FIG. 1).

Step 705

Transmit the transaction group to the second electronic device (e.g., the second electronic device E_2 in FIG. 1).

In one embodiment, the first electronic device E_1 is a GPU and the second electronic device E_2 is a DRAM controller for controlling a DRAM. The input transactions T_I1, T_I2 can be read commands or write commands for the DRAM. After receiving the input transactions T_I1, T_I2, the second electronic device E_2 may correspondingly transmits response or data to the first electronic device E_1.

Other detail steps can be acquired from the above-mentioned embodiments, thus are omitted for brevity here.

In view of above-mentioned embodiments, the merge condition can be dynamically changed corresponding to different transmission conditions, thus the issue caused by the fixed merge window of a conventional merge device can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transaction merging method, for a first electronic device and a second electronic device, comprising:

(a) receiving a plurality of input transactions from the first electronic device;

(b) for input transactions of the plurality of input transactions which correspond to continuous access regions of the target electronic device, dynamically setting a merge condition of the input transactions according to a transmission condition between the first electronic device and the second electronic device, the merge condition indicating how many input transactions corresponding to continuous access regions of the target electronic device in a transaction group, wherein the number of input transactions in the transaction group is equal to or less than a total number of input transactions corresponding to continuous access regions of the target electronic device;

(c) merging the input transactions according to the merge condition to generate at least one transaction group; and (d) transmitting the transaction group to the second electronic device.

2. The transaction merging method of claim 1, wherein the merge condition is a size of a merge window of the input transactions.

3. The transaction merging method of claim 1, wherein the merge condition indicates each transaction group only comprises one input transaction.

4. The transaction merging method of claim 1, wherein the transmission condition is a bandwidth condition of a target device controlled by the second electronic device.

5. The transaction merging method of claim 1, wherein the transmission condition is a latency sensitivity level of the input transactions.

6. The transaction merging method of claim 1, wherein the transmission condition is a type of the input transactions.

7. The transaction merging method of claim 1, wherein the input transactions are read commands or write commands for a target electronic device which is controlled by the second electronic device.

8. The transaction merging method of claim 7, wherein the access regions are addresses.

9. The transaction merging method of claim 1, wherein the second electronic device is a DRAM controller for controlling a DRAM.

10. The transaction merging method of claim 9, wherein the input transactions are transactions of an AR channel or an AW channel of the DRAM.

11. A transaction merging system, comprising:

a first communication interface, configured to receive a plurality of input transactions from the first electronic device;

a merge device, configured to, for input transactions of the plurality of input transactions which correspond to continuous access regions of the target electronic device, dynamically set a merge condition of the input transactions according to a transmission condition between the first electronic device and a second electronic device, the merge condition indicating how many input transactions corresponding to continuous access regions of the second electronic device in a transaction group, wherein the number of input transactions in the transaction group is equal to or less than a total number of input transactions corresponding to continuous access regions of the second electronic device, and configured to merge the input transactions according to the merge condition to generate at least one transaction group;

a second communication interface, configured to transmit the transaction group to the second electronic device.

12. The transaction merging system of claim 11, wherein the merge condition is a size of a merge window of the input transactions.

13. The transaction merging system of claim 11, wherein the merge condition indicates each transaction group only comprises one input transaction.

14. The transaction merging system of claim 11, wherein the transmission condition is a bandwidth condition of a target device controlled by the second electronic device.

15. The transaction merging system of claim 11, wherein the transmission condition is a latency sensitivity level of the input transactions.

16. The transaction merging system of claim 11, wherein the transmission condition is a type of the input transactions.

17. The transaction merging system of claim 11, wherein the input transactions are read commands or write commands for a target electronic device which is controlled by the second electronic device.

18. The transaction merging system of claim 17, wherein the access regions are addresses.

19. The transaction merging system of claim 11, wherein the second electronic device comprises a DRAM controller for controlling a DRAM.

20. The transaction merging system of claim 19, wherein the input transactions are transactions of an AR channel or an AW channel of the DRAM.

* * * * *